United States Patent [19]
Ito

[11] Patent Number: 5,687,028
[45] Date of Patent: Nov. 11, 1997

[54] ZOOM LENS SYSTEM

[75] Inventor: Takayuki Ito, Tokyo, Japan

[73] Assignee: Asahi Kogaku Kogyo Kabushiki Kaisha, Tokyo, Japan

[21] Appl. No.: 681,505

[22] Filed: Jul. 23, 1996

[30] Foreign Application Priority Data

Jul. 24, 1995  [JP]  Japan ................... 7-187098

[51] Int. Cl.$^6$ ..................... G02B 15/14; G02B 13/18
[52] U.S. Cl. ............................. 359/692; 359/714
[58] Field of Search ........................ 359/692, 687, 359/688, 690, 714

[56] References Cited

U.S. PATENT DOCUMENTS

| | | | |
|---|---|---|---|
| 4,196,969 | 4/1980 | Itoh | 359/689 |
| 4,792,215 | 12/1988 | Sato | 359/691 |
| 4,812,022 | 3/1989 | Sato | 359/691 |
| 4,836,660 | 6/1989 | Ito | 359/692 |
| 5,315,440 | 5/1994 | Betensky et al. | 359/692 |
| 5,353,162 | 10/1994 | Ito et al. | 359/692 |
| 5,412,508 | 5/1995 | Lin | 359/692 |
| 5,424,871 | 6/1995 | Ito et al. | 359/689 |

*Primary Examiner*—Scott J. Sugarman
*Attorney, Agent, or Firm*—Greenblum & Bernstein, P.L.C.

[57] ABSTRACT

A zoom lens system includes a positive first lens group and a negative second lens group in this order from an object side. A distance between the first and second lens groups is varied during a zooming operation. The first lens group consists of a negative first sub-group and a positive second sub-group, in this order from an object side. The negative first sub-group consisting of a negative first lens element, having a concave surface facing toward the object side, and a negative second lens element, having a concave surface that faces toward an image side, in this order from the object side. The negative first sub-group being provided with at least one aspherical surface. The zoom lens system satisfies the following relationships:

$$SF1 < -34 < SF2$$

$$-0.4 < r_{1-1}/f_L < -0.15$$

$$0.15 < r_{2-2}/f_L < 0.32$$

wherein SF1 represents a shaping factor of the negative first lens element ($=(r_{1-1}+r_{1-2})/(r_{1-1}-r_{1-2})$), SF2 represents a shaping factor of the negative second lens element ($=(r_{2-1}+r_{2-2})/(r_{2-1}-r_{2-2})$), $r_{i-j}$ represents a radius of curvature of the j-th surface of the i-th negative lens element, and $f_L$ represents a focal length of the whole lens system at a longest focal length extremity.

4 Claims, 6 Drawing Sheets

FIG. 1
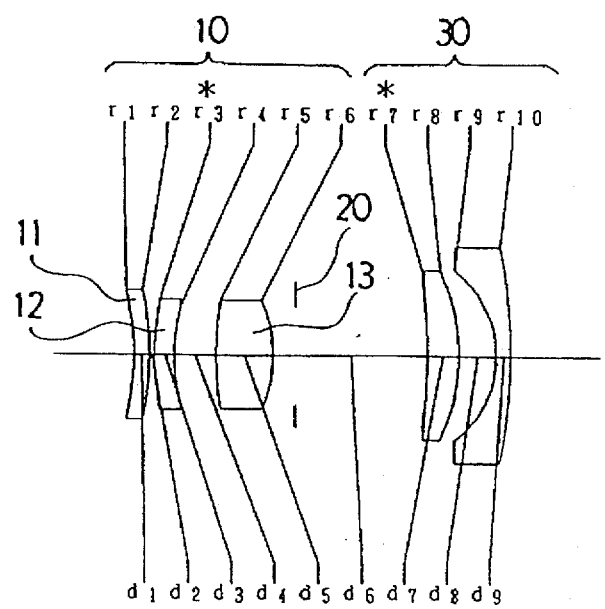
FIG. 2A  FIG. 2B  FIG. 2C  FIG. 2D
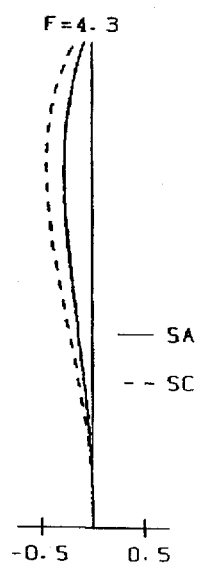
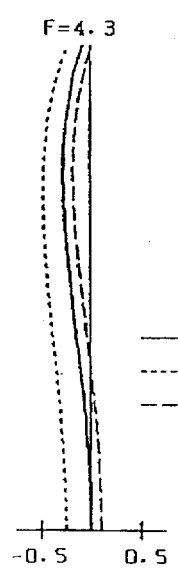
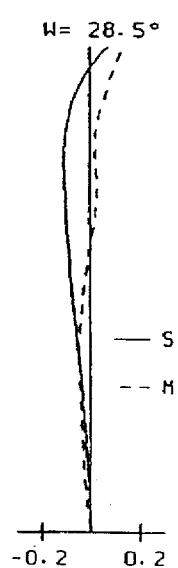
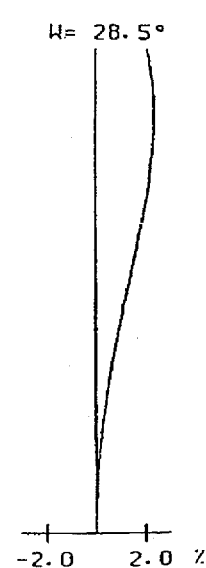

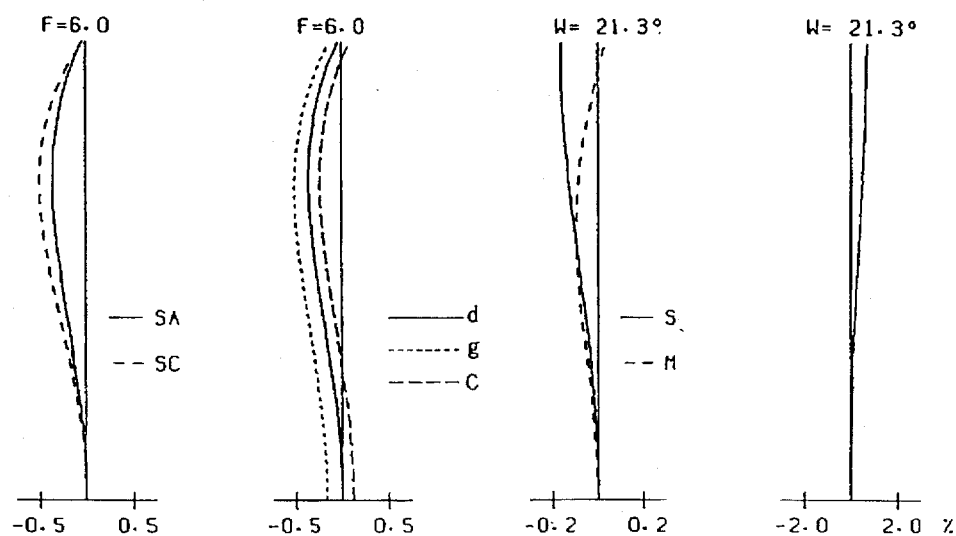
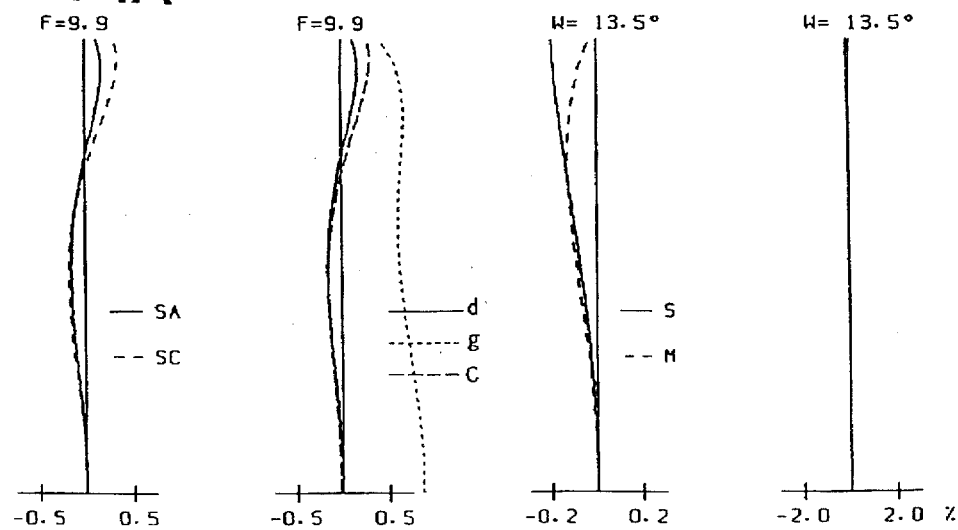

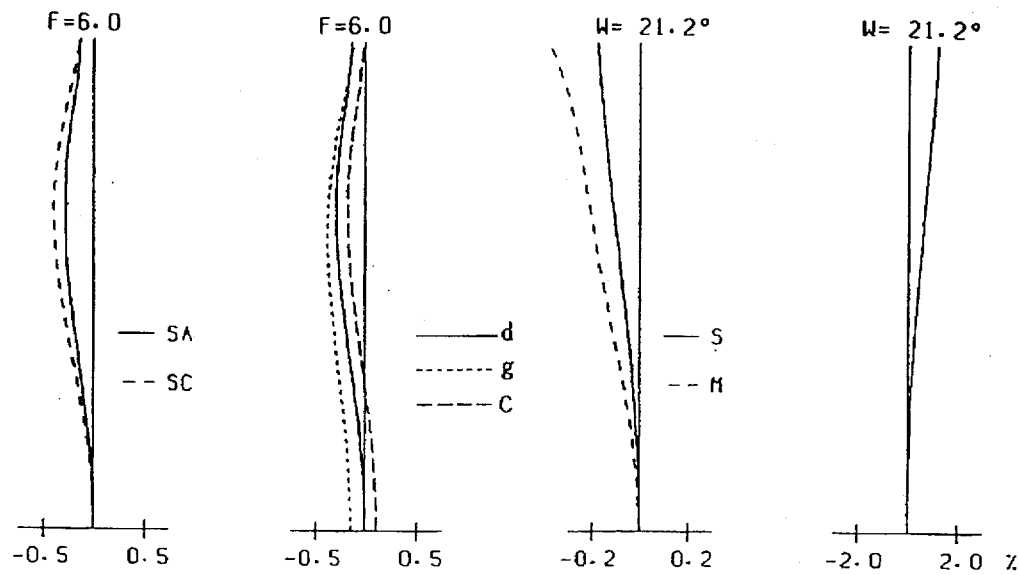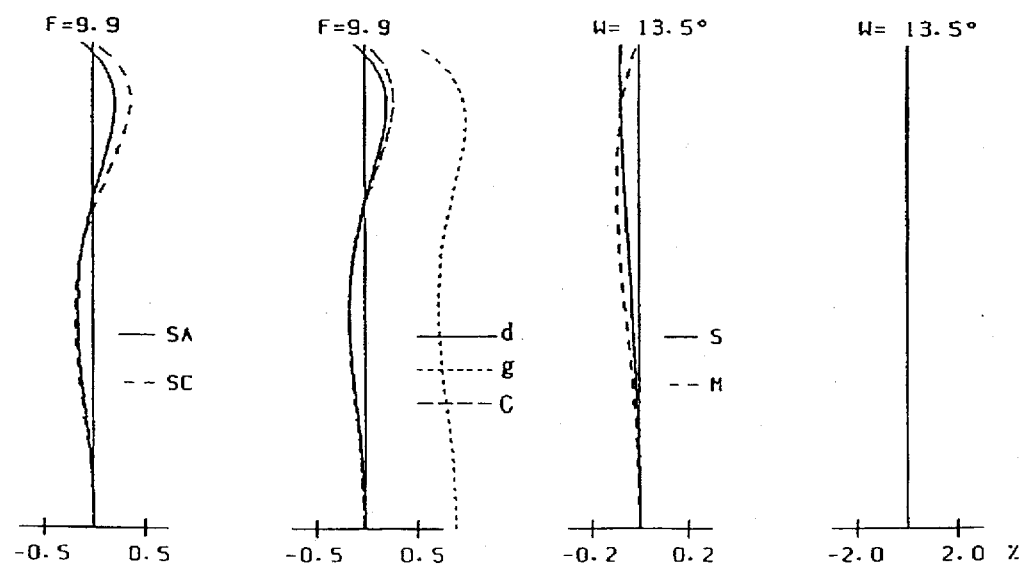

FIG. 9
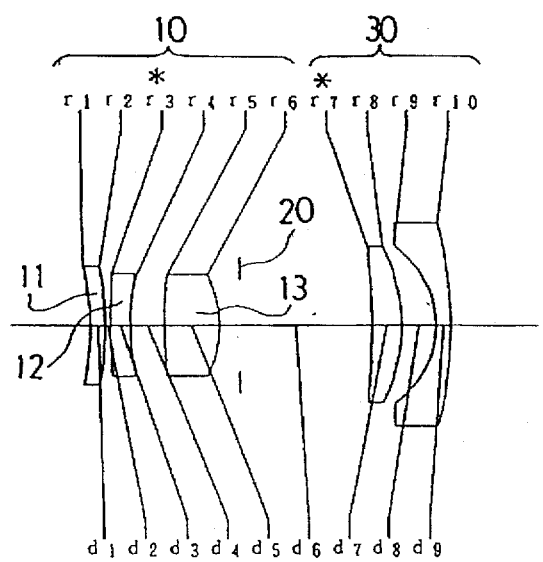
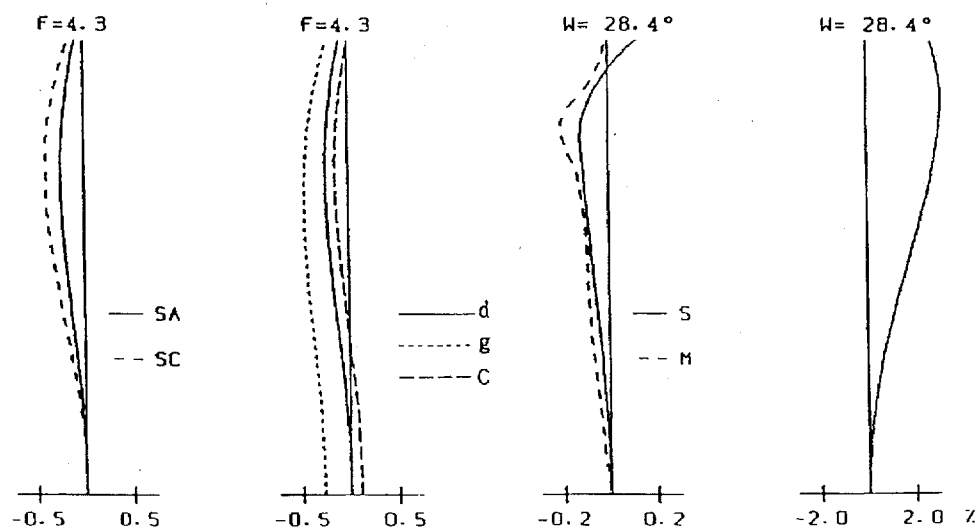
FIG. 10A  FIG. 10B  FIG. 10C  FIG. 10D

ZOOM LENS SYSTEM

BACKGROUND OF THE INVENTION

1. Field of the Invention

The present invention relates to a zoom lens system for use with a compact camera whose back focal distance is shorter than that of a single lens reflex camera.

2. Description of the Related Art

In a zoom lens system for a compact camera, in order to reduce the number of lens elements, an aspherical surface is generally used. However, in comparison with a spherical lens, an aspherical lens has the disadvantage that aberrations can be easily increased due to decentering or a deviation of the optical axis of the lens element. In particular, in a camera having an increased magnification or having a compact lens system, axial comatic aberration increases due to decentering or a deviation of the optical axis. Consequently, in order to easily manufacture the zoom lens system, it is necessary to make the aberration less sensitive to a decentering or a deviation of the aspherical surface.

SUMMARY OF THE INVENTION

It is an object of the present invention to provide a small zoom lens system having an increased zoom ratio (magnification) using an aspherical surface which can be advantageously used with a compact camera, in which the number of lens elements can be reduced.

To achieve the object mentioned above, according to the present invention, a zoom lens is provided, which has a positive first lens group and a negative second lens group in this order from an object side, in which a distance between the first and second lens groups is varied during a zooming operation. The first lens group consists of a negative first sub-group and a positive second sub-group in this order from the object side. The negative first sub-group consists of a negative first lens element, having a concave surface facing toward the object side, and a negative second lens element, having a concave surface that faces toward an image side in this order from the object side. The negative first sub-group being provided with at least one aspherical surface. The zoom lens system satisfies the following formulae:

$$SF1 < -3 \quad (1)$$

$$4 < SF2 \quad (2)$$

$$-0.4 < r_{1-1}/f_L < -0.15 \quad (3)$$

$$0.15 < r_{2-2}/f_L < 0.32 \quad (4)$$

wherein SF1 represents a shaping factor of the negative first lens element, namely $(r_{1-1} + r_{1-2})/(r_{1-1} - r_{1-2})$, SF2 represents a shaping factor of the negative second lens element, namely $(r_{2-1} + r_{2-2})/(r_{2-1} - r_{2-2})$, $r_{i-j}$ represents a radius of curvature of the j-th surface of the i-th negative lens element, and $f_L$ represents a focal length of the whole lens system at a longest focal length extremity.

Preferably, the aspherical surface of the negative first sub-group is a divergent aspherical surface and satisfies the following formula:

$$-40 < \Delta I_{ASP} < 0 \quad (5)$$

wherein $\Delta I_{ASP}$ represents a sum of variations of spherical aberration factor caused by the aspherical surface of the negative first sub-group when the focal length at a shortest focal length extremity is assumed to be 1.0.

Preferably, the negative first lens element is made of a glass and the negative second lens element is made of a plastic, and is being provided with a surface which is a divergent aspherical surface.

Preferably, the positive second sub-group consists of a single positive lens.

The present disclosure relates to subject matter contained in Japanese Patent Application No. 7-187098 (filed on Jul. 24, 1995) which is expressly incorporated herein by reference in its entirety.

BRIEF DESCRIPTION OF THE DRAWINGS

The invention will be described below in detail with reference to the accompanying drawings, in which like elements are indicated by like reference numerals, and wherein:

FIG. 1 is a schematic view of a lens arrangement of a zoom lens system according to a first embodiment of the present invention;

FIGS. 2a, 2b, 2c, and 2d show diagrams of various aberrations of the lens system shown in FIG. 1 at a shortest focal length extremity;

FIGS. 3a, 3b, 3c and 3d show diagrams of various aberrations of the lens system shown in FIG. 1 at an intermediate focal length;

FIGS. 4a, 4b, 4c and 4d shows diagrams of various aberrations of the lens system shown in FIG. 1 at a longest focal length extremity;

FIGS. 7a, 7b, 7c and 7d show diagrams of various aberrations of the lens system shown in FIG. 5 at an intermediate focal length;

FIGS. 8a, 8b, 8c and 8d show diagrams of various aberrations of the lens system shown in FIG. 5 at a longest focal length extremity;

FIG. 9 is a schematic view of a lens arrangement of a zoom lens system according to a third embodiment of the present invention;

FIGS. 10a, 10b, 10c and 10d show diagrams of various aberrations of the lens system shown in FIG. 9 at a shortest focal length extremity;

DESCRIPTION OF THE PREFERRED EMBODIMENTS

Figure 5:
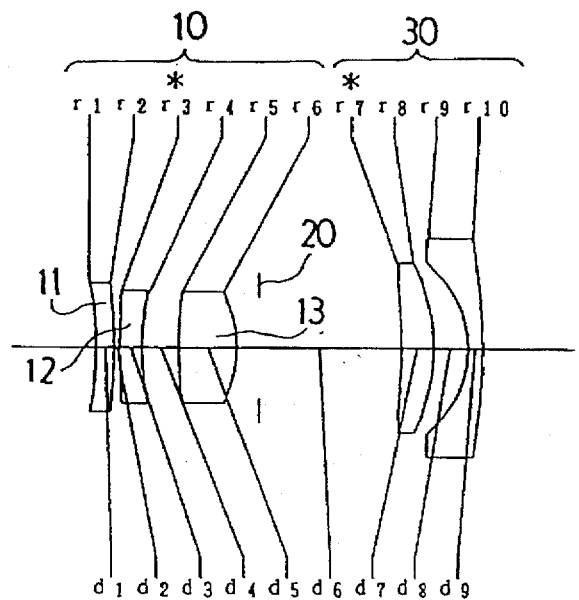
FIG. 5 is a schematic view of a lens arrangement of a zoom lens system according to a second embodiment of the present invention.
Figures 6A, 6B, 6C, 6D:
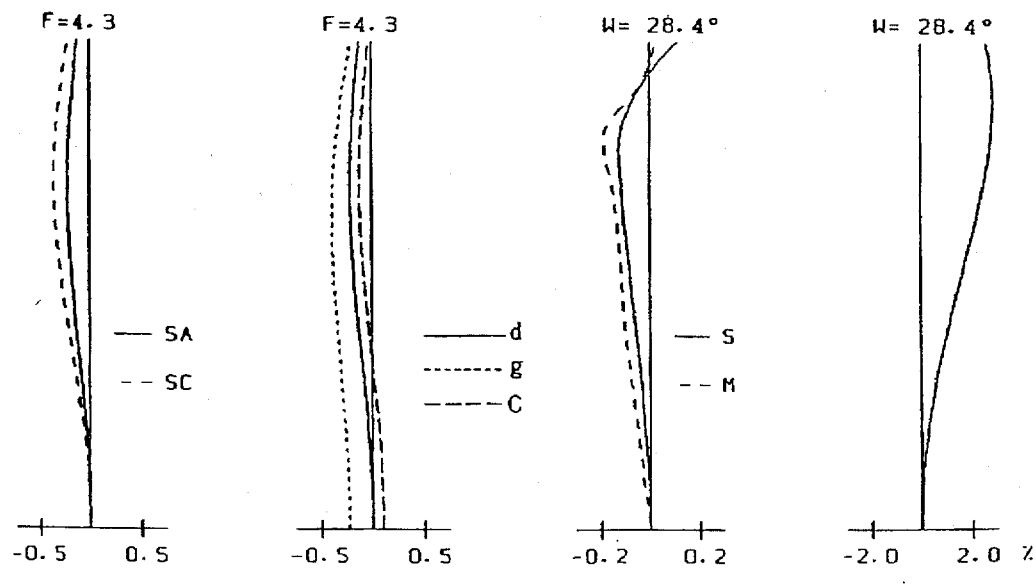
FIGS. 6a, 6b, 6c and 6d shows diagrams of various aberrations of the lens system shown in FIG. 5 at a shortest focal length extremity.
Figures 11A, 11B, 11C, 11D:
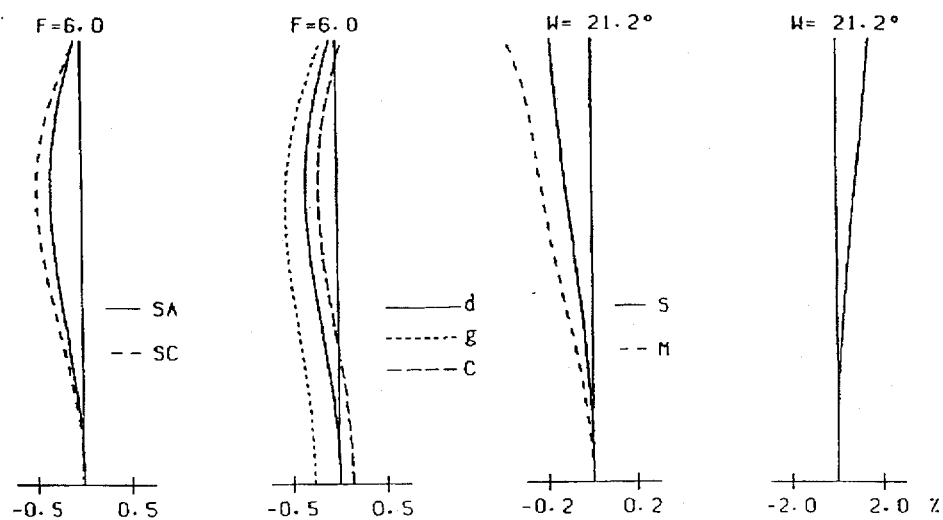
FIGS. 11a, 11b, 11c and 11d show diagrams of various aberrations of the lens system shown in FIG. 9 at an intermediate focal length; and, FIGS. 12a, 12b, 12c and 12d show diagrams of various aberrations of the lens system shown in FIG. 9 at a longest focal length extremity.
Figures 12A, 12B, 12C, 12D:
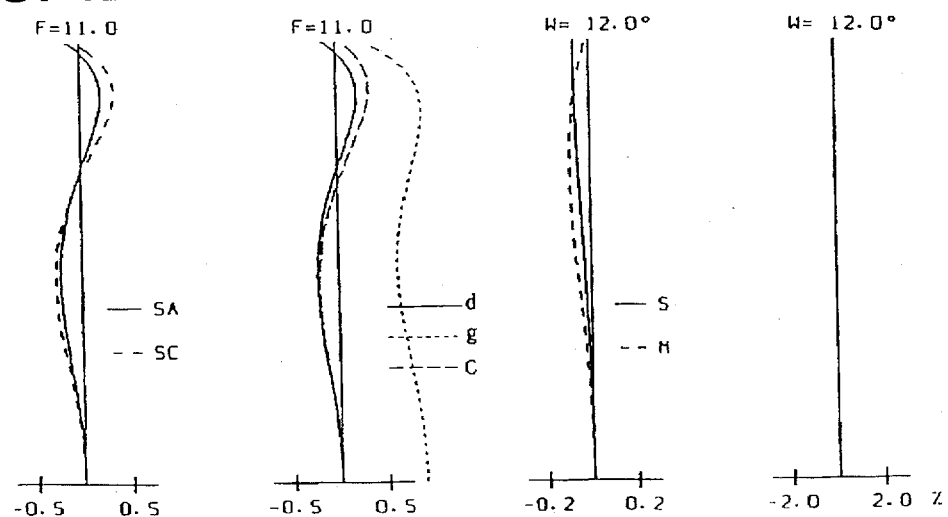

In a zoom lens system having a positive first lens group and a negative second lens group, the power of the first lens group is increased if the size of the zoom lens is decreased and the zoom ratio is increased. To correct for aberrations without decreasing the positive power of the first lens group, a lens having a divergent aspherical surface is normally used in a negative first sub-group belonging to the positive first lens group. However, if the amount of asphericity is increased to correct for aberrations, the deterioration of the aberration, due to decentering or a deviation of the optical axis of the lens elements, increases.

To solve this problem in the present invention, the negative first sub-group having the aspherical surface consists of two negative lens elements the shapes of which are such that the effect of the divergent aspherical surface is ameliorated by another divergent spherical surface, and hence even if the amount of asphericity is small, the aberrations can be effectively corrected and the lens system is less sensitive to decentering or a deviation of the optical axis of the lens elements.

The above-mentioned formulae (1) and (2) specify the shaping factors of the negative first and second lens elements of the negative first sub-group. The negative first lens element is made of a meniscus lens the surface of which adjacent to the object side, is a concave surface of large curvature (i.e., small radius of curvature) so as to meet the requirement specified in formula (1). The negative second lens element is made of a meniscus lens the surface of which located on the image side, is a concave surface of large curvature so as to meet the requirement specified in formula (2).

If the value of SF1 specified in formula (1) exceeds the upper limit, the curvature of the concave surface of the negative first lens element located on the object side is too small (the radius of curvature is too large). If the value of SF2 specified in formula (2) is less than the lower limit, the curvature of the concave surface of the negative second meniscus lens located on the image side is too small. Consequently, the divergency of the spherical surface components of the two concave surfaces is reduced, and hence, the amount of asphericity must be increased to supplement the divergency, contrary to the object of the present invention.

The above-mentioned formulae (3) and (4) specify the radius of curvature of the two concave surfaces mentioned above. The lower limit in formula (3) and the upper limit in formula (4) are determined so as to provide the same effect as formulae (1) and (2).

If the value of the ratio defined in formula (3) exceeds the upper limit, the amount of asphericity can be effectively reduced, but the radius of curvature of the concave surface of the negative first lens element located on the object side is too small and the off-axis image surface tends to be inclined due to a deviation or decentering.

If the value of the ratio specified in formula (4) is below the lower limit, the radius of curvature of the concave surface of the negative second lens element located on the image side is so small that the axial comatic aberration due to a deviation or decentering is increased by the deviation or decentering.

The above-mentioned formula (5) specifies the amount of asphericity. If the value in formula (5) is above the upper limit, the aspherical surface has no divergency, so that no aberration in the first lens group of large positive power can be compensated for. Conversely, if the value is below the lower limit, the amount of asphericity is so large that the axial comatic aberration due to decentering or a deviation, particularly on the long focal length side, becomes large when the zoom ratio is increased.

To reduce the manufacturing cost, a plastic lens could be employed. However, a plastic lens tends to be more easily scratched and is less durable than a glass lens. Moreover, since the negative first lens element of the negative first sub-group is located away from a diaphragm, it is preferable that the negative first lens element is made of a material having a high refractive index to correct for aberrations. To this end, the negative first lens element of the negative first sub-group is made of a glass lens and the negative second lens element of the negative first sub-group is made of a plastic lens. Since the negative second lens element is positioned within the zoom lens system, i.e., is not exposed outside, there is less chance that the plastic lens will be scratched. Since there are many more types of glass lenses compared to plastic lenses, there is an increased freedom to select the refractive index. Therefore, the first lens element located further away from the diaphragm (compared with the second lens element) can be made of, for example, a glass having a refractive index of more than 1.7 to easily correct for the curvature of field or distortion, etc.

The aspherical lens to be used, i.e., the second negative lens element, is preferably made of a plastic material in view of the manufacturing cost. Moreover, since the second negative lens element is made of a meniscus lens having a concave surface of a large curvature located on the image side so as to meet the requirements defined by formulae (2) and (4), advantageously the convex surface on the object side is a divergent aspherical surface, which can restrict the axial comatic aberrations due to decentering or a deviation of the lens elements.

The variation of the third-order spherical aberration coefficient due to the aspherical surface will be discussed below. In general, an aspherical shape can be represented by the following formula, namely:

$$X = cy^2/[1+\{1-c^2y^2(1+K)\}^{1/2}] + \alpha_4 y^4 + \alpha_6 y^6 + \qquad (i)$$

wherein:

K represents a conic constant.

Formula (ii) can be obtained from formula (i), in terms of the focal length f=1.0, when X=x/f, Y=y/f, C=fc, $A_4 = f^3 \alpha_4$, $A_6 = f^5 \alpha_6$, $A_8 = f^7 \alpha_8$, and $A_{10} = f^9 \alpha_{10}$ $$X = CY^2/[1+\{1-C^2Y^2(1+K)\}^{1/2}] + A_4 Y^4 + A_6 Y^6 + \qquad (ii)$$

The second and subsequent terms (i.e., $A_4 Y^4$ onwards) represent amounts of asphericity. The constant $A_4$ has the following relationship with the third-order aspherical surface coefficient Φ:

$$\Phi = 8(N'-N)A_4$$

wherein N represents the refractive index of the side closer to the object than the aspherical surface, and N' represents the refractive index of the side closer to the image side than the aspherical surface.

ΔI=$h^4 \Phi$

ΔII=$h^3 H \Phi$

ΔIII=$h^2 H^2 \Phi$

ΔIV=$h^2 H^2 \Phi$

ΔV=$hH^3 \Phi$ wherein

I represents a spherical aberration factor,

II represents a comatic aberration factor,

III represents an astigmatism factor,

IV represents a curvature factor of the sagittal image surface,

V represents a distortion factor, h represents a height of the portion of the lens at which the paraxial on-axis ray passes through the lens, and H represents a height of the portion of the lens at which the paraxial off-axis ray passes through the center of the pupil.

Numerical embodiments (examples) of the lens system according to the present invention will be described below with reference to the attached drawings and the following tables.

In the following tables and drawings "SA" represents the spherical aberration, "SC" represents the sine conditions, "d-line", "g-line" and "C-line" represent the chromatic aberrations represented by the spherical aberrations at the respective wavelengths, "S" and "M" represent the sagittal rays and the meridional rays, respectively, "$F_{NO}$" represents the F number, "f" represents the focal length, "W" represents the half angle of view, "$f_B$" represents the back focal distance, "R" represents the radius of curvature, "d" represents the distance between the lenses or the lens thickness, "$N_d$" represents the refractive index at the d-line, and "$v_d$" represents the Abbe number at the d-line.

EMBODIMENT 1

FIGS. 1 through 4 show a first embodiment of the present invention. The zoom lens system of the present embodiment consists of a positive first lens group 10, a diaphragm 20, and a negative second lens group 30, in this order from the object side.

The first lens group 10 consists of a negative first sub-group and a positive second sub-group. The negative first sub-group having a negative first lens element 11 made of a glass, whose concave surface faces toward the object side, and a negative second lens element 12 made of a plastic material whose concave surface faces toward the image side. The positive second sub-group consists of a single positive lens element 13. The lens arrangement of the first embodiment is shown in FIG. 1. FIGS. 2a, 2b, 2c, 2d, 3a, 3b, 3c, 3d, 4a, 4b, 4c and 4d show aberrations at a shortest focal length extremity, an intermediate focal length, and a longest focal length extremity, respectively.

Numerical data regarding the present embodiment is shown in Table 1 below.

TABLE 1

$F_{NO} = 1:4.3–6.1–9.9$
$f = 39.00–55.00–90.00$
$W = 28.5–21.3–13.5$
$f_B = 10.08–25.52–59.29$

| Surface No. | R | d | $N_d$ | $v_d$ |
|---|---|---|---|---|
| 1 | −22.067 | 1.40 | 1.80518 | 25.4 |
| 2 | −31.019 | 0.50 | — | — |
| 3* | 24.370 | 1.80 | 1.58547 | 29.9 |
| 4 | 19.132 | 3.82 | — | — |
| 5 | 35.801 | 5.30 | 1.48749 | 70.2 |
| 6 | −13.396 | 2.00 | — | — |
| Diaphragm | ∞ | 12.21–7.23–2.5 | — | — |
| 7* | −42.150 | 3.03 | 1.58547 | 29.9 |
| 8 | −18.574 | 3.47 | — | — |
| 9 | −10.390 | 1.40 | 1.80610 | 40.9 |
| 10 | −48.189 | — | — | — |

*marked surface is aspherical.
Aspherical Data:

No. 3: K = 0.0, A4 = −0.88716 × 10⁻⁴, A6 = −0.87393 × 10⁻⁶,
A8 = 0.0 A10 = 0.0, A12 = 0.0
No. 7: K = 0.0, A4 = 0.54210 × 10⁻⁴, A6 = 0.27366 × 10⁻⁶,
A8 = 0.33852 × 10⁻⁸, A10 = 0.0, A12 = 0.0

EMBODIMENT 2

FIGS. 5 through 8 show a second embodiment of a zoom lens system according to the present invention. FIG. 5 shows a lens arrangement of the zoom lens system of the present embodiment. The basic structure of the second embodiment is substantially the same as the first embodiment. FIGS. 6a, 6b, 6c, 6d, 7a, 7b, 7c, 7d, 8a, 8b, 8c and 8d show aberrations at a shortest focal length extremity, an intermediate focal length, and a longest focal length extremity, respectively.

Numerical data regarding the second embodiment is shown in Table 2 below.

TABLE 2

$F_{NO} = 1:4.3–6.1–9.9$
$f = 39.00–55.00–90.00$
$W = 28.4–21.2–13.5$
$f_B = 9.66–24.69–57.57$

| Surface No. | R | d | $N_d$ | $v_d$ |
|---|---|---|---|---|
| 1 | −30.727 | 1.63 | 1.74077 | 27.8 |
| 2 | −53.509 | 0.50 | — | — |
| 3* | 41.392 | 2.00 | 1.58547 | 29.9 |
| 4 | 26.382 | 3.32 | — | — |
| 5 | 42.841 | 5.30 | 1.48749 | 70.2 |
| 6 | −12.346 | 2.00 | — | — |
| Diaphragm | ∞ | 13.35–8.44–3.7 | — | — |
| 7* | −45.673 | 3.00 | 1.58547 | 29.9 |
| 8 | −18.489 | 3.25 | — | — |
| 9 | −10.344 | 1.40 | 1.80610 | 40.9 |
| 10 | −53.728 | — | — | — |

*marked surface is aspherical.
Aspherical Data:

No. 3: K = 0.0, A4 = −0.12015 × 10⁻³, A6 = −0.12072 × 10⁻⁵,
A8 = 0.0 A10 = 0.0, A12 = 0.0
No. 7: K = 0.0, A4 = 0.58787 × 10⁻⁴, A6 = 0.28183 × 10⁻⁶,
A8 = 0.36354 × 10⁻⁸, A10 = 0.0, A12 = 0.0

EMBODIMENT 3

FIGS. 9 through 12 show a third embodiment of a zoom lens system according to the present invention. FIG. 9 shows a lens arrangement of the zoom lens system of the present embodiment. The basic structure of the third embodiment is substantially the same as the first embodiment. FIGS. 10a, 10b, 10c, 10d, 11a, 11b, 11c, 11d, 12a, 12b, 12c and 12d show the aberrations at a shortest focal length extremity, an intermediate focal length, and a longest focal length extremity, respectively.

Numerical data regarding the third embodiment is shown in Table 3 below.

TABLE 3

$F_{NO} = 1:4.3–6.1–11.2$
$f = 39.00–55.00–102.00$
$W = 28.4–21.2–12.0$
$f_B = 9.28–23.76–66.29$

| Surface No. | R | d | $N_d$ | $v_d$ |
|---|---|---|---|---|
| 1 | −26.450 | 1.40 | 1.76182 | 26.6 |
| 2 | −39.828 | 0.50 | — | — |
| 3* | 38.190 | 2.00 | 1.58547 | 29.9 |
| 4 | 26.519 | 3.27 | — | — |
| 5 | 46.496 | 5.30 | 1.48749 | 70.2 |
| 6 | −12.364 | 2.00 | — | — |
| Diaphragm | ∞ | 13.06–8.43–3.22 | — | — |
| 7* | −41.068 | 3.00 | 1.58547 | 29.9 |
| 8 | −18.468 | 3.33 | — | — |
| 9 | −10.129 | 1.40 | 1.83481 | 42.7 |
| 10 | −44.165 | — | — | — |

*marked surface is aspherical.
Aspherical Data:

No. 3: K = 0.0, A4 = −0.11454 × 10⁻³, A6 = −0.11994 × 10⁻⁵,
A8 = 0.0 A10 = 0.0, A12 = 0.0
No. 7: K = 0.0, A4 = 0.65421 × 10⁻⁴, A6 − 0.32866 × 10⁻⁶,
A8 = 0.43405 × 10⁻⁸, A10 = 0.0, A12 = 0.0

Table 4 shows numerical data regarding the formulae (1) through (5) in the three embodiments described above.

TABLE 4

|  | Embodiment 1 | Embodiment 2 | Embodiment 3 |
|---|---|---|---|
| formulae (1) | −5.93 | −3.70 | −4.95 |
| formulae (2) | 8.31 | 4.52 | 5.54 |
| formulae (3) | −0.245 | −0.341 | −0.259 |
| formulae (4) | 0.213 | 0.293 | 0.260 |
| formulae (5) | −28.1 | −37.2 | −35.5 |

As can be seen from Table 4, the first through third embodiments satisfy the requirements defined in formulae (1) through (5).

As may be understood from the above discussion, a zoom lens system employing an aspherical lens, according to the present invention, has fewer lens elements and an enhanced magnification and can be made small. Moreover, according to the present invention, the lenses are shaped such that there is little or no deterioration in the aberrations due to a deviation or a decentering of the aspherical lens.

What is claimed is:

1. A zoom lens system comprising a positive first lens group and a negative second lens group in this order from an object side, in which a distance between said first and second lens groups is varied during a zooming operation, wherein:

said first lens group comprises a negative first sub-group and a positive second sub-group in this order from said object side, said negative first sub-group comprising a negative first lens element, having a concave surface facing toward said object side, and a negative second lens element, having a concave surface that faces toward an image side in this order from said object side, said negative first sub-group being provided with at least one aspherical surface, and wherein said zoom lens system satisfies the following relationships:

$SF1 < -3$ $4 < SF2$ $-0.4 < r_{1-1}/f_L < -0.15$ $0.15 < r_{2-2}/f_L < 0.32$ wherein SF1 represents a shaping factor of said negative first lens element ($=(r_{1-1}+r_{1-2})/(r_{1-1}-r_{1-2})$), SF2 represents a shaping factor of said negative second lens element ($=(r_{2-1}+r_{2-2})/(r_{2-1}-r_{2-2})$), $r_{i-j}$ represents a radius of curvature of the j-th surface of the i-th negative lens element, and $f_L$ represents a focal length of the whole lens system at a longest focal length extremity.

2. The zoom lens system according to claim 1, wherein said aspherical surface of said negative first sub-group is a divergent aspherical surface and satisfies the following relationship:

$-40 < \Delta I_{ASP} < 0$ wherein $\Delta I_{ASP}$ represents a sum of variations of an spherical aberration factor caused by said aspherical surface of said negative first sub-group when said focal length at a shortest focal length extremity is assumed to be 1.0.

3. The zoom lens system according to claim 1, wherein said negative first lens element comprises a glass lens, and said negative second lens element comprises a plastic lens, said negative second lens element being provided with a divergent aspherical surface.

4. The zoom lens system according to claim 1, wherein said positive second sub-group consists of a single positive lens.

* * * * *